US012730654B2

(12) United States Patent
Frank et al.

(10) Patent No.: US 12,730,654 B2
(45) Date of Patent: Sep. 8, 2026

(54) SYSTEM AND COMPUTER-IMPLEMENTED METHOD TO GENERATE A CONFIGURATION FOR EXTERNAL DATAPOINT ACCESS

(71) Applicant: Siemens Aktiengesellschaft, Munich (DE)

(72) Inventors: Johannes Frank, Meerbusch (DE); Ingo Thon, Grasbrunn (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 742 days.

(21) Appl. No.: 18/128,410

(22) Filed: Mar. 30, 2023

(65) Prior Publication Data

US 2023/0325205 A1 Oct. 12, 2023

(30) Foreign Application Priority Data

Apr. 6, 2022 (EP) .................................... 22166871

(51) Int. Cl.
*G06F 9/445* (2018.01)

(52) U.S. Cl.
CPC ................................ *G06F 9/44505* (2013.01)

(58) Field of Classification Search
CPC .... G06F 16/211; G06F 16/214; G06F 16/215; G06F 16/22; G06F 16/221; G06F 8/38; G06F 8/34; G06F 9/44505; G06V 30/153
See application file for complete search history.

(56) References Cited

U.S. PATENT DOCUMENTS

2003/0035005 A1 2/2003 Kodosky
2005/0149552 A1* 7/2005 Chan .................... G06F 16/211 707/999.102

(Continued)

FOREIGN PATENT DOCUMENTS

EP 3968148 A1 3/2022

OTHER PUBLICATIONS https://en.wikipedia.org/wiki/Supervised_learning; retrieved Apr. 5, 2022.

(Continued)

*Primary Examiner* — Daniel Samwel
(74) *Attorney, Agent, or Firm* — Schmeiser Olsen PLLC

(57) ABSTRACT

A computer-implemented method for generating a configuration for external datapoint access is provided, whereby the configuration includes at least one datapoint within an automation system, including: a) searching for and capturing at least one input and/or output field; b) extracting annotation data near to a visualized automation process value in a found I/O-field and surrounding the I/O-field; c) attributing extracted annotation data to at least one datapoint within the automation system; d) providing a data scheme built with via edges linked components representing elements of the user interface surface; e) querying a search through the data scheme for one or more visualized pre-selected automation process values and f) generating a configuration with at least one datapoint along with linked supplemental information as a result from the search; and g) outputting the configuration in an automation system readable and/or computer-readable format.

15 Claims, 4 Drawing Sheets

(56) References Cited

U.S. PATENT DOCUMENTS

| | | | | |
|---|---|---|---|---|
| 2020/0125076 | A1 | 4/2020 | Zhang | |
| 2021/0019157 | A1* | 1/2021 | Voicu | G06N 3/09 |
| 2021/0133349 | A1* | 5/2021 | Jensen | G06F 21/6245 |
| 2021/0303342 | A1* | 9/2021 | Dunn | G06F 16/9024 |
| 2023/0108015 | A1* | 4/2023 | Mayer | G06V 10/82<br>704/9 |

OTHER PUBLICATIONS https://new.siemens.com/global/en/products/automation/industry-software/automation-software/tia-portal/software.html; retrieved Apr. 5, 2022.

https://en.wikipedia.org/wiki/Edit_distance; retrieved Apr. 5, 2022.

https://www.wiwi.uni-klde/bisor-orwikl/Enumeration_methods_5; retrieved Apr. 5, 2022.

https://en.wikipedia.org/wiki/Digital_twin; retrieved Apr. 5, 2022.

https://en.wikipedia.org/wiki/String-searching_algorithm; retrieved Apr. 5, 2022.

https://en.wikipedia.org/wiki/Integer_programming; retrieved Apr. 5, 2022.

* cited by examiner

W
82454336_S7-1200_SIWAREX_Set6_PROJ_v5d0_V17 ▸ HMI_1 [TP700 Comfort] ▸ Screens ▸ 03_Filling
Tahoma
12
TOUCH
100%
Error
Service
Pt
+9e
1/4do
Empty
Limit2
Limit1
Tara=
0000.0 g
SDT
WProt
Recipe view
12/31/2000 10:59:39 AM
Teach
Single Set Point:
0000.0 mg
Tolerance:
0000.0 mg
Diameter:
00 mm
Busy
1
Weight
Quality:
Packet counter:
Instruction:
DataLog no.:
0000.0 mg
0
0000000000
DataLogCreate
0000000000
DataLog
OFF
M2
M1
+000.0%
+0000.0 mg
Stop
Reset
SDT
DataLog error status:
No errors

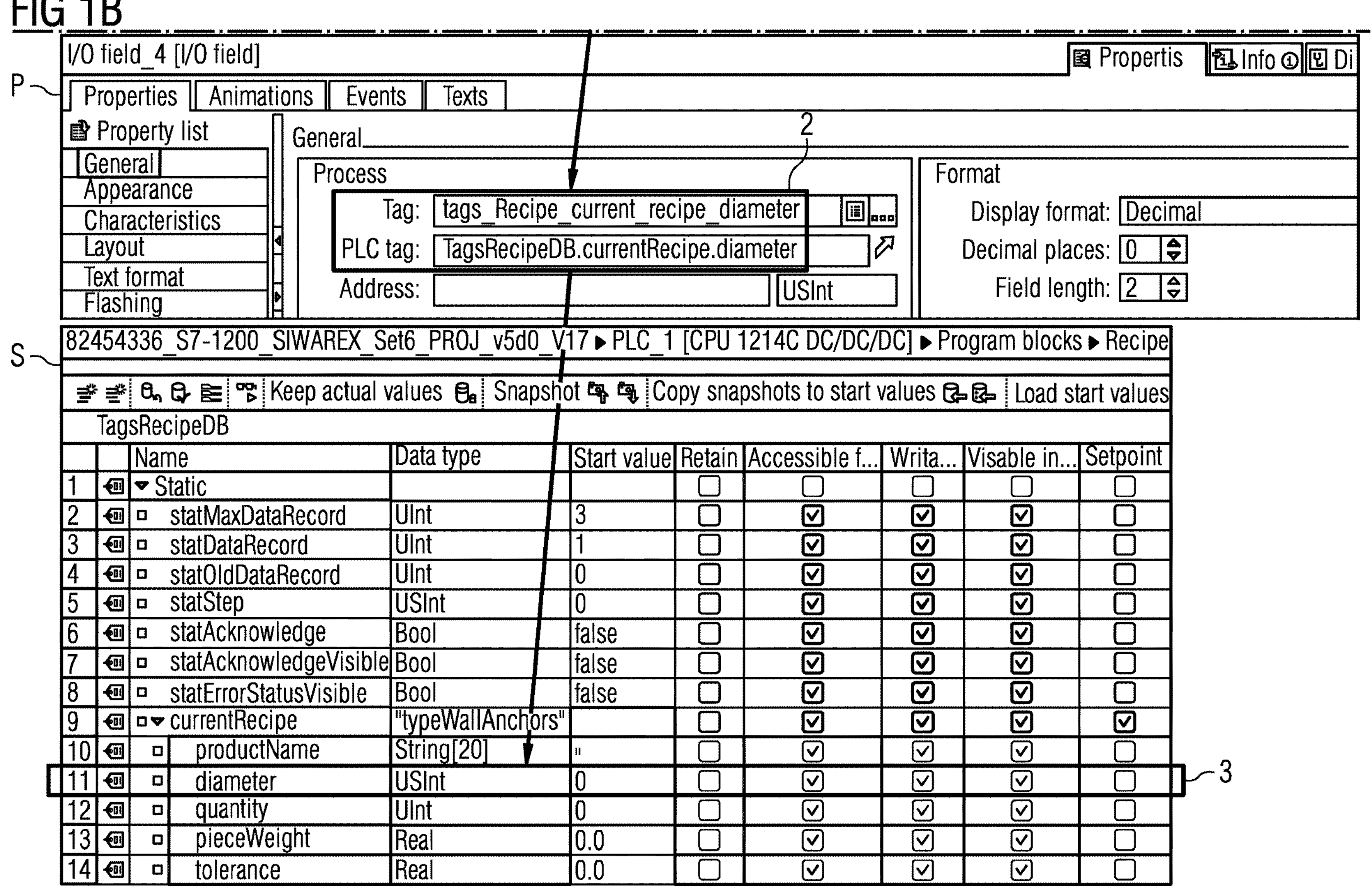

| | Name | Data type | Start value | Retain | Accessible f... | Writa... | Visable in... | Setpoint |
|---|---|---|---|---|---|---|---|---|
| 1 | ▾ Static | | | ☐ | ☐ | ☐ | ☐ | ☐ |
| 2 | statMaxDataRecord | UInt | 3 | ☐ | ☑ | ☑ | ☑ | ☐ |
| 3 | statDataRecord | UInt | 1 | ☐ | ☑ | ☑ | ☑ | ☐ |
| 4 | statOldDataRecord | UInt | 0 | ☐ | ☑ | ☑ | ☑ | ☐ |
| 5 | statStep | USInt | 0 | ☐ | ☑ | ☑ | ☑ | ☐ |
| 6 | statAcknowledge | Bool | false | ☐ | ☑ | ☑ | ☑ | ☐ |
| 7 | statAcknowledgeVisible | Bool | false | ☐ | ☑ | ☑ | ☑ | ☐ |
| 8 | statErrorStatusVisible | Bool | false | ☐ | ☑ | ☑ | ☑ | ☐ |
| 9 | ▾ currentRecipe | "typeWallAnchors" | | ☐ | ☑ | ☑ | ☑ | ☑ |
| 10 | productName | String[20] | '' | ☐ | ☑ | ☑ | ☑ | ☐ |
| 11 | diameter | USInt | 0 | ☐ | ☑ | ☑ | ☑ | ☐ |
| 12 | quantity | UInt | 0 | ☐ | ☑ | ☑ | ☑ | ☐ |
| 13 | pieceWeight | Real | 0.0 | ☐ | ☑ | ☑ | ☑ | ☐ |
| 14 | tolerance | Real | 0.0 | ☐ | ☑ | ☑ | ☑ | ☐ |

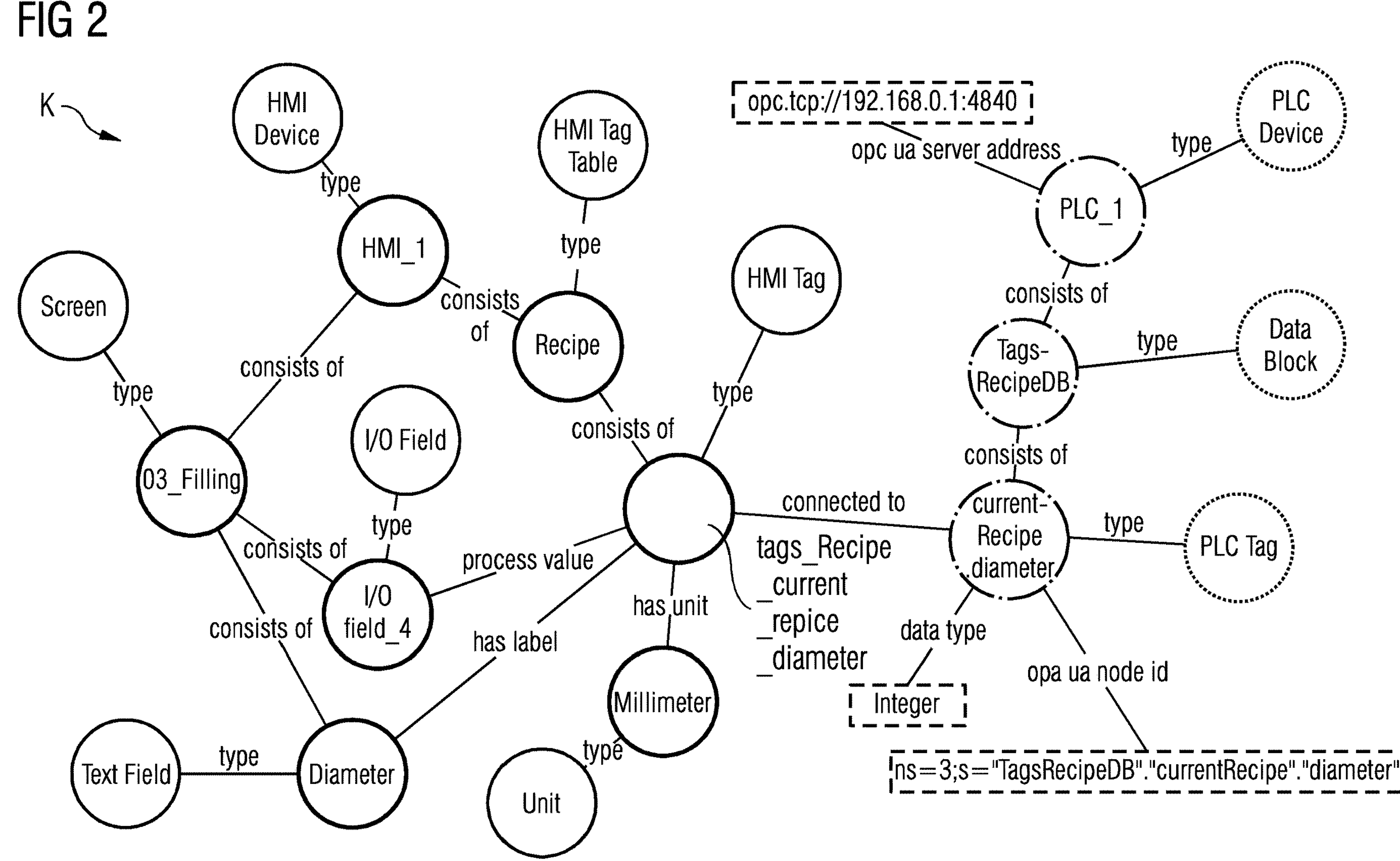
FIG 2
K
HMI Device
type
HMI_1
HMI Tag Table
type
consists of
Recipe
Screen
type
consists of
03_Filling
I/O Field
type
consists of
I/O field_4
consists of
Diameter
Text Field
type
process value
has label
consists of
HMI Tag
type
has unit
Millimeter
type
Unit
tags_Recipe_current_repice_diameter
connected to
opc.tcp://192.168.0.1:4840
opc ua server address
PLC_1
type
PLC Device
consists of
Tags-RecipeDB
type
Data Block
consists of
current-Recipe diameter
type
PLC Tag
data type
Integer
opa ua node id
ns=3;s="TagsRecipeDB"."currentRecipe"."diameter"

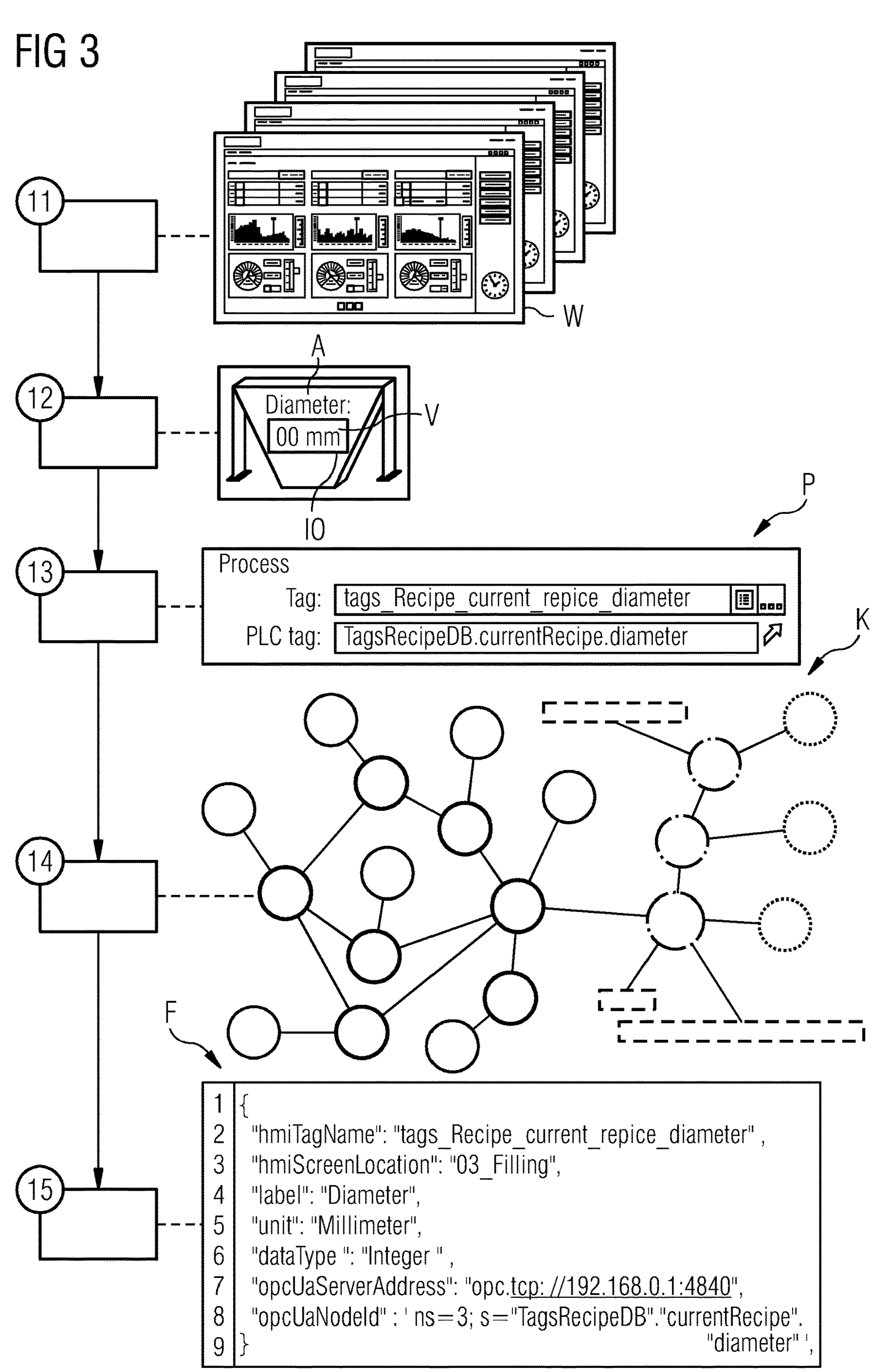
FIG 3
11
12
13
14
15
W
A
Diameter:
00 mm
V
IO
P
Process
Tag:
tags_Recipe_current_repice_diameter
PLC tag:
TagsRecipeDB.currentRecipe.diameter
K
F
{
"hmiTagName": "tags_Recipe_current_repice_diameter" ,
"hmiScreenLocation": "03_Filling",
"label": "Diameter",
"unit": "Millimeter",
"dataType ": "Integer " ,
"opcUaServerAddress": "opc.tcp: //192.168.0.1:4840",
"opcUaNodeId" : ' ns=3; s="TagsRecipeDB"."currentRecipe". "diameter" ',
}

SYSTEM AND COMPUTER-IMPLEMENTED METHOD TO GENERATE A CONFIGURATION FOR EXTERNAL DATAPOINT ACCESS

CROSS-REFERENCE TO RELATED APPLICATIONS

This application claims priority to EP Application No. 22166871.8, having a filing date of Apr. 6, 2022, the entire contents of which are hereby incorporated by reference.

FIELD OF TECHNOLOGY

The following relates to system and computer-implemented method for generating a configuration for external datapoint access.

BACKGROUND

A typical industrial plant is a complex system, comprising of a wide range of various interconnected components, such as controllers, IO systems, industrial communication modules, energy distribution systems, etc. Each component possesses a variety of different features required for the operation of the respective system and fulfillment of the required functionalities.

Automating processes in any of these industries requires engineers to design and configure an industrial automation system—in other words to complete an engineering project for an engineering system, consisting of a multitude of individual software- and/or hardware components or modules, the interplay of which fulfills the functional requirements arising from the intended application, e.g., automotive. Selection of necessary components is typically done using configuration software offered by their manufacturer. A known engineering tool as configuration software is TIA portal which is—for example—described in https://new.siemens.com/global/en/products/automation/industry-software/automation-software/tia-portal/software.html.

A variety of standards, regulations and guidelines have been developed to regulate the industrial domain and to ensure high quality and safety of the developed engineering systems. In engineering projects an engineer must often follow the applicable regulations, customer or branch specific technological standards as well as technological regulations (e.g., Safety, Motion, etc.) in addition to the optional style guidelines.

Furthermore in the industrial environment there is a communication standard called OPC Unified Architecture (OPC UA). OPC UA is a cross-platform, open-source, IEC62541 standard for data exchange from sensors to cloud applications developed by the OPC Foundation.

A recent trend of industry 4.0 is the Information and operational technology convergence that enables access to data from automation systems for further monitoring and analytics using edge devices and data connectors. This edge devices and data connectors need a configuration that specifies which datapoints within the automation system should be observed/extracted/analyzed/measured/monitored.

But finding, accessing, and extracting the relevant datapoints to monitor/analyze the process/machine that is controlled by an automation system is challenging due to the huge amount of available datapoints in such a system and the lack of annotation and non-standardized naming conventions, e.g., using non-English language, cryptic abbreviations etc. Often only domain experts or even only the engineer of various disciplines (electrical, mechatronics, automation) who developed the automation program know which datapoints are available, what is the unit of measurement, where they are defined and how they are named within the automation program.

However, the users who need to collect/observe/access the relevant datapoints for a specific problem are often IT staff, analysts, or data scientists. They don't know anything about the underlying structure of the automation program to properly configure the edge devices and/or data connectors. Even if they can talk to the engineer, it's a lot of effort, which is time-consuming and error-prone, to manually identify and configure the relevant datapoints.

It is possible to provide access to automation system datapoints based on a OPC UA companion specification, which is a layer on top of the underlying data structures of the automation system. However, the modelling and mapping effort for such a companion specification is high, therefore its adoption is low. Besides the modelling effort this implies often changes within the program structure and configuration of the automation system which is often not accepted within operational systems.

Even if there would be access via an OPC UA companion specification it is still unknown which datapoints are relevant for the operation of the current machine or process due to the huge amount of available datapoints in such a system. Again, this leads to the problem that there must be access to the knowledge of the engineer of the automation system as well as domain expert and still lot of manual configuration effort.

SUMMARY

An aspect relates to an improved system and/or an improved method to automate a configuration process for relevant datapoints which can be externally accessed.

Embodiments of the invention claim a method for computer-implemented method generating a configuration for external datapoint access, whereby the configuration comprises at least one datapoint within an automation system, comprising the following method steps which can be executed by one or more processors:

a) searching for and capturing at least one input and/or output field, named I/O-field, as an element of various/several elements on at least one user interface surface;
b) extracting annotation data near to a visualized automation process value in a found I/O-field and surrounding the I/O-field;
c) attributing extracted annotation data to at least one datapoint within the automation system, whereby each datapoint is related to supplemental information of corresponding engineering project artifacts of the automation system;
d) providing a data scheme built with via edges linked components representing elements of the user interface surface, the exacted annotation data and the at least one datapoint as well as the supplemental information, wherein each edge represents a relationship between two components;
e) querying a search through the data scheme for one or more visualized pre-selected automation process values and
f) generating a configuration with at least one datapoint along with linked supplemental information as a result from the search, wherein the linked supplemental information comprises information how to externally access the at least one datapoint; and g) outputting the configuration in an automation system readable and/or computer-readable format.

Artifacts in the engineering environment are usually key elements or information in the engineering project which can design an automation system or its digital twin (https://en.wikipedia.org/wiki/Digital_twin).

The user interface surface is active when it is automatically e.g., via a Bot or manually e.g., via user interaction selected from an amount of user interfaces surfaces.

At least a part of a user interface surface can also be an open window on the surface. An HMI (Human machine interface or rather a user interface) displays the surface on a screen. an automation process value is visualized in an I/O-field on the user interface surface;

Annotation data can be extracted by discovering an annotation typical character. As examples the following characters are typical for an annotation: ":", "#", ";" etc.

Annotation data can be extracted by scanning annotation typical regions surrounding the I/O-field. For example, in regions where languages using latin letters and the reading direction is from left to right annotation data are typically placed left from or top of or—in rare cases—below an I/O field, whereas a unit label it typically to the right of the I/O-field.

Annotation data can also be extracted by comparing font size of text surrounding the I/O-field with median font size used on the at least one user interface. The font size of an annotation is typically a bit larger than the font size of the text/value in an I/O-field or the median font size of the user interface.

Each of the annotation data extraction methods can be combined with each other and each of them can be weighted.

This weighting can be introduced into an optimization method or is learned via machine learning in order to reach a minimal cost assignment to the weighting.

The weight of each annotation data extraction method can be represented by a cost parameter or cost function. These cost parameters or cost functions can be introduced into the optimization procedure/method e.g., complete enumeration (https://www.wiwi.uni-kl.de/bisor-orwiki/Enumeration-_methods_5) or mixed inter linear programming (https://en.wikipedia.org/wiki/Integer_programming).

The weighting of the costs/cost functions can be learned using super-vised machine learning on the basis of labeled data. Supervised learning is the machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal) (https://en.wikipedia.org/wiki/Supervised_learning).

Each of the annotation data extraction methods has the technical advantage that are fast and less complicated in finding the relevant annotations that possibly known methods which scan through each screen row and/or line for such potential findings.

Extracted annotation data can be attributed to a visualized automation process value by matching the annotation string against a string of the at least one datapoint with a certain degree of differences.

The degree of differences can be determined by various string matching algorithms which are described in https://en.wikipedia.org/wiki/String-searching_algorithm. One further possible method to define the degree of differences is the so-called edit distance. Edit distance is a way of quantifying how dissimilar two strings (e.g., words) are to one another by counting the minimum number of operations required to transform one string into the other. Edit distances find applications in natural language processing, where automatic spelling correction can determine candidate corrections for a misspelled word by selecting words from a dictionary that have a low distance to the word in question (https://en.wikipedia.org/wiki/Edit_distance).

Annotation data can be labels of a process or measurement units which are assign via above mentioned TIA. The labels can be compared with labels in a pool of typical units. Such a pool can be stored in TIA. For the extracted annotation which is attributed to a datapoint can be compared with labels representing underlying PLC-Tags deposited e.g., in TIA or another engineering software tool.

The data scheme can be knowledge graph, which contains nodes and edges as relationships between the nodes, which represent elements of the user interface surface, the exacted annotation data and the at least one datapoint as well as the supplemental information.

The output of the inventive method can be used for external data access for a data connector or edge device.

Embodiments of the invention provide the following benefits:

- datapoints without knowing the underlying automation system data structures are linked with semantic meaning of relevant datapoints. This reduces time and engineering cost.
- Enabling the automatic configuration of data connectors which reduces configuration effort (less time, less error-prone, less cost) compared to the manually typed configuration.
- No modification to the automation system is needed which increases customer acceptance.
- Bundling the connected engineering project artifacts in a Knowledge Graph offers further potential use cases e.g., information retrieval, recommender systems, engineering assistance.

Embodiments of the invention further claim a system, in particular a data processing system, for generating a configuration for external datapoint access, whereby the configuration comprises at least one datapoint within an automation system, whereby the system comprises one or more processors which is or are configured to:

a) searching for and capturing at least one input and/or output field, named I/O-field, as an element of various/several elements on at least one user interface surface;

b) extracting annotation data near to a visualized automation process value in a found I/O-field and surrounding the I/O-field;

c) attributing extracted annotation data to at least one datapoint within the automation system, whereby each datapoint is related to supplemental information of corresponding engineering project artifacts of the automation system;

d) providing a data scheme built with via edges linked components representing elements of the user interface surface, the exacted annotation data and the at least one datapoint as well as the supplemental information, wherein each edge represents a relationship between two components;

e) querying a search through the data scheme for one or more visualized automation process values and f) generating a configuration with at least one datapoint along with linked supplemental information as a result from the search, wherein the linked supplemental information comprises information how to externally access the at least one datapoint; and g) outputting the configuration in an automation system readable and/or computer-readable format.

Embodiments of the invention further claim a device having a processor and/or controller which is configured to receiving a generated configuration with at least one datapoint along with linked supplemental information as a result from a search through a data scheme for one or more visualized automation process values, wherein the linked supplemental information comprises information how to externally access the at least one datapoint;

accessing the at least one datapoint for analyzing and/or measuring and/or monitoring their automation process values;

steering and/or controlling an automation system according to results from the analysis, measurement and/or monitoring.

Embodiments of the invention further claim a system comprising the data processing system and at least one such device.

Embodiments as described above for the method can be analogous applied for the (data processing) system, device and for a computer program product (non-transitory computer readable storage medium having instructions, which when executed by a processor, perform actions) and for the computer-readable storage medium.

This (data processing) system and the device can be implemented by hardware, firmware and/or software or a combination of them.

The computer-readable storage medium stores instructions executable by one or more processors of a computer, wherein execution of the instructions causes the computer system to perform the method.

The computer program (product) is executed by one or more processors of a computer and performs the method.

BRIEF DESCRIPTION

Some of the embodiments will be described in detail, with reference to the following figures, wherein like designations denote like members, wherein:

FIG. 1B illustrates the potential initial situation;

FIG. 2 shows an example for a data scheme, in particular a knowledge graph; and FIG. 3 depicts a flow chart for the method steps for generating a configuration for external datapoint access.

DETAILED DESCRIPTION

Figure 1A:
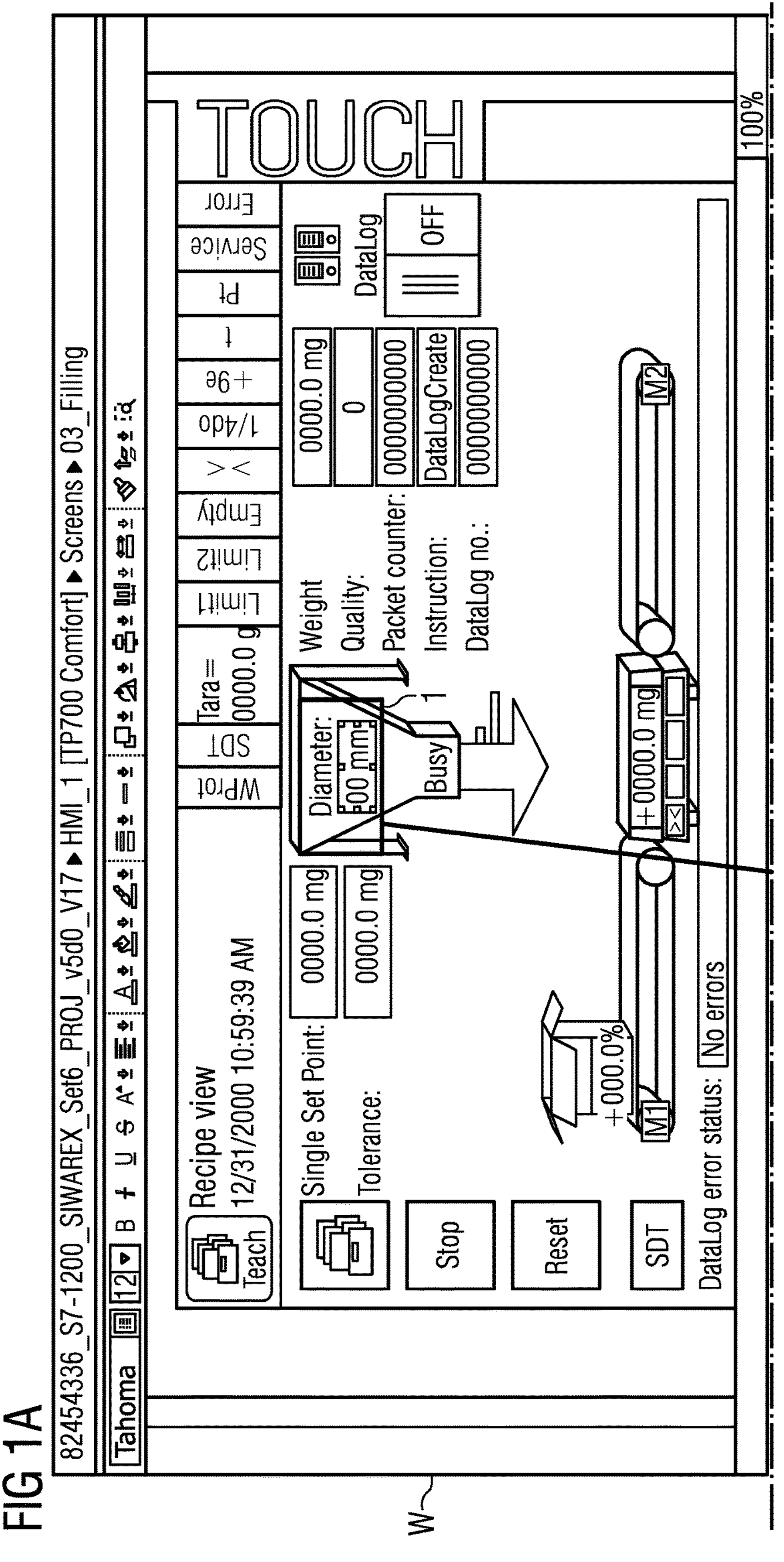
FIG. 1A illustrates a potential initial situation for embodiments of the invention.

FIGS. 1A and 1B shows the example of an HMI (human machine interface) screen. There can be several screens of an automation system—in this example a filling plant—within an engineering project. One of the screens can be selected by a user. The user can also select a window W of potential various windows on the screen. The selected screen and/or window means an active user interface surface. Due to the graphical visualization it is understandable which datapoint is relevant and available to monitor/control the filling process without the need to understand the underlying data structure of the datapoints in the automation system. Eventually, the labels near/next to the I/O-fields, that visualize the process values, give semantic annotation for the meaning of the process values and the unit of measurement, e.g., Diameter is measured in mm (millimeter).

Reference sign 1 in FIGS. 1A and 1B: The process values V visualized in I/O fields IO on these screens most likely are the relevant ones that need to be extracted for further data collection/monitoring/analytics. Annotation A e.g., "diameter" around the process values are combined with additional/supplemental information from artifacts of the engineering project which can be designed via an engineering software tool P like the above-mentioned TIA portal. For example:

connection to underlying datapoints in automation system. For example, the datapoint "diameter" in a data base S for automation system variables declaration, maybe also TIA portal (see reference sign 3).

Shown in in reference sign 2, the annotation "diameter" is brought together with a PLC tag (PLC=programmable logic controller) within the automation system.

Supplementary information (not shown) above all for external access, e.g., OPC UA Server address, OPC UA node IDs of PLC tags (ID=Identifier) come from the engineering project and is connected with the PLC tag.

If the connection is not already deposited in the engineering software tool, then a string-matching algorithm can be applied in order to attribute the annotation (data) to at least one datapoint within the automation system.

The result of the combination is bundled into a data scheme, in particular a knowledge Graph K. Providing the knowledge graph would further enable e.g., a configuration tool for a data connector, to query the knowledge graph and to automatically generate a configuration for external data access including the combined additional information.

As described above this annotation can be extracted and enriched with supplemental information of connected engineering project artifacts and is represented in a knowledge graph. An example of the knowledge graph is shown in FIG. 2. The knowledge graph is built with via edges linked components representing elements of the user interface surface, the exacted annotation data and the at least one datapoint as well as the supplemental information, wherein each edge represents a relationship between two components.

The content of the dotted line boxes integrated into the knowledge graph shows e.g., the supplemental information OPC UA Server address, the supplemental information OPC UA node ID and the data type "integer" of the PLC Tag "diameter".

FIG. 3 shows the detailed steps for generating a configuration for external datapoint access (reference signs 11 to 15):

11: In the beginning there is an access needed to a user interface, e.g., an HMI screen within an engineering project using a programmatic interface of the engineering system, e.g., the TIA-Tool: TIA Openness.

12: searching for and capturing at least one input and/or output field, named I/O-field, extract surrounding text or rather labels that might provide additional metadata, e.g., annotation of visualized process value in the I/O-field and maybe unit of measurement.

After all labels/annotations and I/O-fields have been discovered and/or extracted the corresponding elements need to be connected or rather to be attributed.

To establish a relationship the following meta data is generated, this can be among others scanning annotation typical regions surrounding the I/O-field. The relative location, e.g., in western regions a label/annotation to an I/O-field is typically to the left, top and in rare cases below the I/O-field, whereas a unit label it typically to the right of the I/O-field.

The appearance of a typical character, e.g., a colon ':'

A string matching with the edit distance as difference degree between extracted annotation string (e.g., Diameter) and HMI Tag name string (e.g., tags_Recipe_current_recipe_diameter). The edit distance is defined by the number of characters which need to be deleted, added, or replaced to match the two strings.

In case the engineering project is enabled for multi-language support, it has an i18n (Abbreviation for internationalization) table included. This table contains the translation of label texts into different supported languages, e.g.,: in English: Diameter, in German: Durchmesser and in Spanish: Diametro.

In this case a vector of edit distances is calculated.

Comparing the string of the labels to a data base/pool of typical units

The font size relative to the size of the I/O-Label, and the font sizes relative to the median font size on the screen.

Each of these features can be weighted to turn them in assignment costs.

In addition, features for the consistency of the overall assignments are generated Percentage of I/O-fields which do not have an annotation attributed and/or units assigned.

Font size of unit/label assignment consistency

Label location relative to the I/O-field.

All these costs/cost functions are incorporated in a suitable optimization procedure, e.g., complete enumeration, Mixed integer linear programming, which generate a minimal cost assignment. Alternatively, an assignment procedure taking this meta data and/or the raw data into account.

The weighting of the costs can be learned using machine learning on the basis of labeled data.

13: Extract the underlying datapoint (PLC tag) that is visualized/controlled by the IO-field and supplemental information of connected engineering project artifacts (e.g., OPC UA Server configuration, OPC UA node ids)

14: Parse and load datapoint and these information into a Knowledge Graph.

15: Query the Knowledge Graph for process values that are visualized on each screen, including populated metadata like annotations, units, and information how to access the datapoint externally e.g., via OPC UA node Id.

This configuration can be provided to further configure data connectors running on edge devices that extract the runtime data and can populate it additionally with the extracted metadata.

The user might select which screens are most important for the monitoring/control. So only relevant datapoints from these screens are included in the configuration.

A not shown system comprises a data processing system for generating a configuration for external datapoint access and a not shown control device or several control devices—all connected to each other. The control device is designed to receive a generated configuration with at least one datapoint along with linked supplemental information as a result from a search through a data scheme for one or more visualized automation process values, wherein the linked supplemental information comprises information how to externally access the at least one datapoint. Furthermore the control device accesses the at least one datapoint for analyzing and/or measuring and/or monitoring their process values. The control device steers and/or controls an automation system according to results from the analysis, measurement and/or monitoring. The automation system can be integrated into the above-mentioned system or be connected to it via usually use wired and/or wireless communication technology.

The above-mentioned data processing system can be integrated into a (computer) cloud.

The data processing system includes one or more processors and can be coupled with a data, where the processor(s) is/are configured to execute the method steps.

An output unit of the data processing system that is not shown provides the configuration in an automation system readable and/or computer-readable format.

Such a format should be computer-readable, e.g., one or more Excel lists in CSV format or other text format F (see FIG. 3), which contains the queried result from the search through the data scheme, in particular in form of a knowledge graph.

These list(s) can then be sent to the control device(s) for their reception. A processor of the control device can then perform the steering and/or controlling of the automation system.

In addition, and alternatively, it is possible that the control device receives other computer-readable control signals in order to initiate the mentioned steering/control process by its processor(s).

In embodiments, the method can be executed by at least one processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the system and/or computer and/or another processor may be configured to implement the acts described herein.

The above-described method may be implemented via a computer program (product) including one or more computer-readable storage media having stored thereon instructions executable by one or more processors of a computing system and/or computing engine. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Embodiments of the invention have been described in detail. Variations and modifications may, however, be effected within the spirit and scope of embodiments of the invention covered by the claims. The phrase "at least one of A, B and C" as an alternative expression may provide that one or more of A, B and C may be used.

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

It is to be understood that the elements and features recited in the appended claims may be combined in different ways to produce new claims that likewise fall within the scope of embodiments of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

None of the elements recited in the claims are intended to be a means-plus-function element unless an element is expressly recited using the phrase "means for" or, in the case of a method claim, using the phrases "operation for" or "step for".

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for generating a configuration for external datapoint access, whereby the configuration comprises at least one datapoint within an automation system, the method comprising the following method steps which can be executed by one or more processors:

a) searching for and capturing at least one input and/or output field, named an I/O-field, as an element of several elements on at least one user interface surface;

b) extracting annotation data near to a visualized automation process value in a found I/O-field and surrounding the I/O-field;

c) attributing extracted annotation data to at least one datapoint within the automation system, whereby each datapoint is related to supplemental information of corresponding engineering project artifacts of the automation system;

d) providing a data scheme built with via edges linked components representing elements of the user interface surface, the exacted annotation data and the at least one datapoint as well as the supplemental information, wherein each edge represents a relationship between two components;

e) querying a search through the data scheme for one or more visualized pre-selected automation process values; and f) generating a configuration with at least one datapoint along with linked supplemental information as a result from the search, wherein the linked supplemental information comprises information how to externally access the at least one datapoint; and g) outputting the configuration in an automation system readable and/or computer-readable format, wherein the configuration is received by a control device that accesses the at least one datapoint for analyzing and/or measuring and/or monitoring the automation process values and steers and/or controls the automation system according to results from the analysis, measurement and/or monitoring.

2. The method according to claim 1, wherein annotation data is extracted by discovering an annotation typical character.

3. The method according to claim 1, wherein annotation data is extracted by scanning annotation typical regions surrounding the I/O-field.

4. The method according to claim 1, wherein annotation data is extracted by comparing font size of text surrounding the I/O-field with the font size of the text or value in the I/O-field or with median font size used on the at least one user interface.

5. The method according to claim 1, wherein annotation extracting methods are combined with each other and each of them are weighted, whereby weighting is introduced into an optimization method or is learned via machine learning in order to reach a minimal cost assignment to the weighting.

6. The method according to claim 1, wherein extracted annotation data is attributed to a visualized automation process value by matching the annotation string against a string of the at least one datapoint with a certain degree of differences.

7. A data processing system for generating a configuration for external datapoint access, whereby the configuration comprises at least one datapoint within an automation system, whereby the system comprises one or more processors which is or are configured to:

a) search for and capture at least one input and/or output field, named an I/O-field, as an element of several elements on at least one user interface surface;

b) extract annotation data near to a visualized automation process value in a found I/O-field and surrounding the I/O-field;

c) attribute extracted annotation data to at least one datapoint within the automation system, whereby each datapoint is related to supplemental information of corresponding engineering project artifacts of the automation system;

d) provide a data scheme built with via edges linked components representing elements of the user interface surface, the exacted annotation data and the at least one datapoint as well as the supplemental information, wherein each edge represents a relationship between two components;

e) query a search through the data scheme for one or more visualized automation process values; and f) generate a configuration with at least one datapoint along with linked supplemental information as a result from the search, wherein the linked supplemental information comprises information how to externally access the at least one datapoint; and g) output the configuration in an automation system readable and/or computer-readable format, wherein the configuration is received by a control device that accesses the at least one datapoint for analyzing and/or measuring and/or monitoring the automation process values and steers and/or controls the automation system according to results from the analysis, measurement and/or monitoring.

8. A system according to claim 7, wherein the one or more processors is or are configured to extract annotation data by discovering an annotation typical character.

9. The system according to claim 1, wherein the one or more processors is or are configured to extract annotation data by scanning annotation typical regions surrounding the I/O-field.

10. The system according to claim 1, wherein the one or more processors is or are configured to extract annotation data by comparing font size of text surrounding the I/O-field with the font size of the text or value in the I/O-field or with median font size used on the at least one user interface.

11. The system according to claim 1, wherein the one or more processors is or are configured to combine annotation extracting methods with each other and to weigh each of them, whereby weighting is introduced into an optimization method or is learned via machine learning in order to reach a minimal cost assignment to the weighting.

12. The system according to claim 1, wherein the one or more processors is or are configured to attribute annotation data to a visualized automation process value by matching the annotation string against a string of the at least one datapoint with a certain degree of differences.

13. A device having a processor and/or controller which is configured to:

receive a generated configuration with at least one datapoint along with linked supplemental information as a result from a search through a data scheme for one or more visualized automation process values, wherein the linked supplemental information comprises information how to externally access the at least one datapoint;

access the at least one datapoint for analyzing and/or measuring and/or monitoring their automation process values;

steer and/or control an automation system according to results from the analysis, measurement and/or monitoring.

14. A system comprising the data processing system according to claim 7 and at least one device.

15. A computer program product, comprising a non-transitory computer readable hardware storage device having computer readable program code stored therein, the program code executable by a processor of a computer system to implement a method according to claim 7.

* * * * *